United States Patent
Kim et al.

(10) Patent No.: US 10,306,338 B2
(45) Date of Patent: May 28, 2019

(54) PERSONALIZED USER INTERFACE FOR MANAGING MULTIMEDIA STREAMS

(71) Applicant: KT CORPORATION, Gyeonggi-do (KR)

(72) Inventors: I-Gil Kim, Gyeonggi-do (KR); Dong-Hoon Kim, Gyeonggi-do (KR); Gyu-Tae Baek, Seoul (KR); Young-Il Yoo, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/332,319

(22) Filed: Jul. 15, 2014

(65) Prior Publication Data

US 2015/0020119 A1 Jan. 15, 2015

(30) Foreign Application Priority Data

Jul. 15, 2013 (KR) .................. 10-2013-0083076

(51) Int. Cl.
*H04N 21/8545* (2011.01)
*H04N 21/482* (2011.01)
*H04N 21/258* (2011.01)
*H04N 21/431* (2011.01)

(52) U.S. Cl.
CPC ... *H04N 21/8545* (2013.01); *H04N 21/25891* (2013.01); *H04N 21/4312* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 5,691,768 A | 11/1997 | Civanlar et al. | |
| 6,081,263 A * | 6/2000 | LeGall | H04N 5/4401 715/760 |
| 6,442,755 B1 * | 8/2002 | Lemmons | H04N 5/44543 348/E5.105 |
| 8,429,687 B2 | 4/2013 | Civanlar et al. | |
| 2002/0120925 A1 * | 8/2002 | Logan | 725/9 |
| 2005/0034155 A1 * | 2/2005 | Gordon | H04N 5/4401 725/39 |

(Continued)

FOREIGN PATENT DOCUMENTS

| KR | 10-2000-0058837 A | 10/2000 |
|---|---|---|
| KR | 10-2007-0025279 A | 3/2007 |

(Continued)

*Primary Examiner* — Alexander Q Huerta
(74) *Attorney, Agent, or Firm* — IP Legal Services, LLC

(57) ABSTRACT

The disclosure is related to a personalized user interface having at least one moving image produced based on a multimedia stream received in real time from a preferred streaming server. A service server for providing the personalized user interface may perform receiving multimedia streams transmitted in real time from preferred streaming servers selected based on user interface configuration information, obtaining personalized items based on the user interface configuration information, producing a single multimedia stream for the personalized user interface by combining the received multimedia streams and the obtained personalized items, and transmitting the produced single multimedia stream to the user device.

18 Claims, 10 Drawing Sheets

(56) References Cited

U.S. PATENT DOCUMENTS

| | | | |
|---|---|---|---|
| 2005/0044560 A1* | 2/2005 | Kryeziu | G06Q 30/02 725/14 |
| 2005/0155063 A1* | 7/2005 | Bayrakeri | H04N 5/232 725/47 |
| 2007/0039032 A1* | 2/2007 | Goldey | H04N 5/44591 725/114 |
| 2007/0061840 A1* | 3/2007 | Walter | H04N 5/50 725/39 |
| 2007/0143787 A1 | 6/2007 | Cankaya | |
| 2008/0060006 A1* | 3/2008 | Shanks | H04N 5/44543 725/38 |
| 2008/0066103 A1* | 3/2008 | Ellis | H04N 5/44591 725/38 |
| 2008/0209472 A1* | 8/2008 | Shanks | H04N 5/44543 725/43 |
| 2009/0067507 A1* | 3/2009 | Baird et al. | 375/240.24 |
| 2009/0083798 A1 | 3/2009 | Lee | |
| 2009/0158337 A1* | 6/2009 | Stiers | H04N 5/44591 725/44 |
| 2009/0228943 A1* | 9/2009 | Ramaswamy | H04N 7/17318 725/109 |
| 2010/0122294 A1* | 5/2010 | Craner | H04N 5/44543 725/41 |
| 2010/0153999 A1* | 6/2010 | Yates | 725/39 |
| 2010/0325548 A1* | 12/2010 | Takahira et al. | 715/730 |
| 2011/0113441 A1* | 5/2011 | Jeong | H04N 7/17363 725/25 |
| 2011/0179454 A1* | 7/2011 | Yates | 725/61 |
| 2011/0313864 A1 | 12/2011 | Eldering et al. | |
| 2013/0283318 A1* | 10/2013 | Wannamaker | H04H 20/30 725/56 |
| 2014/0208356 A1* | 7/2014 | McCarthy | H04N 5/44591 725/41 |
| 2014/0337886 A1* | 11/2014 | Zdepski | H04N 21/23424 725/35 |
| 2015/0256881 A1 | 9/2015 | Ellis et al. | |

FOREIGN PATENT DOCUMENTS

| | | |
|---|---|---|
| KR | 10-2008-0023891 A | 3/2008 |
| KR | 10-0822851 B1 | 4/2008 |
| KR | 10-2008-0080196 A | 9/2008 |
| KR | 10-0890643 B1 | 3/2009 |
| KR | 10-2009-0112877 A | 10/2009 |
| KR | 10-2010-0051961 A | 5/2010 |
| KR | 10-2011-0102103 A | 9/2011 |
| KR | 10-1148738 B1 | 5/2012 |
| KR | 10-2012-0071451 A | 7/2012 |

* cited by examiner

PERSONALIZED USER INTERFACE FOR MANAGING MULTIMEDIA STREAMS

CROSS REFERENCE TO PRIOR APPLICATIONS

The present application claims priority under 35 U.S.C. § 119 to Korean Patent Application No. 10-2013-0083076 (filed on Jul. 15, 2013), which is hereby incorporated by reference in its entirety.

The subject matter of this application is related to U.S. patent application Ser. No. 14/332,328 (filed on Jul. 15, 2014), and U.S. patent application Ser. No. 14/332,308 (filed on Jul. 15, 2014), the teachings of which are incorporated herein their entirety by reference.

BACKGROUND

The present disclosure relates to a user interface and, more particularly, to providing a personalized user interface for managing a plurality of streaming servers through a single multimedia stream created by combining a plurality of multimedia streams from the streaming servers.

A typical broadcast service provider transmits the same channel signals to all viewers. Since the same channel signals are transmitted, the same video screens are produced and displayed on display devices at the viewer side. That is, all viewers are watching the same video screens. However, there is a demand to have a customized broadcast service or a targeted video advertisement service according to viewer's characteristics (e.g., viewer preference, tendency, location, ages, etc.).

Lately, a picture-in-picture (PIP) technique has been introduced. The PIP technique enables a TV to display a plurality of broadcast channels on a single screen. In order to perform such PIP operation, a TV receives a plurality of broadcast signals, decodes each of the received broadcast signals through a corresponding decoder, and displays the decoded broadcast signals on a single screen. That is, a TV may be required to include a plurality of decoders in order to display a plurality of broadcast channels on a single screen.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a personalized user interface including at least one moving image may be provided for controlling interaction with a plurality of multimedia streaming servers.

In accordance with another aspect of the present invention, a user interface including at least one moving image produced by decoding a stream received from a preferred streaming server may be produced based on personal preferences.

In accordance with still another aspect of the present invention, a plurality of video streams from streaming servers may be combined to a single multimedia stream, and the single multimedia stream may be provided as a moving image based personalized user interface for managing a plurality of streaming servers.

In accordance with at least one embodiment, a method may be provided for producing a personalized user interface having at least one moving image for managing streaming servers by a service server. The method may include receiving multimedia streams transmitted in real time from preferred streaming servers selected based on user interface configuration information, obtaining personalized items based on the user interface configuration information, producing a single multimedia stream for the personalized user interface by combining the received multimedia streams and the obtained personalized items, and transmitting the produced single multimedia stream to the user device.

The transmitting the produced single multimedia stream may include at the user device, producing the personalized user interface by processing the single multimedia stream received from the service server and displaying on a display the personalized user interface including moving images and personalized items. Each one of the moving images may be produced by processing a corresponding one of the multimedia streams received in real time from the preferred streaming servers and adjusted in a size and a position based on the user interface configuration information.

The receiving multimedia streams may include receiving the user interface configuration information from the user device, determining the preferred streaming servers based on the user interface configuration information, and receiving multimedia streams from the determined preferred streaming servers.

The user interface configuration information may include information on preferred streaming servers and information on personalized items. The information on the personalized items may include information on a size and a position for displaying each moving image, an arrangement of moving images, a skin theme, a background still image, a user interface template, and a layout for displaying the personalized user interface.

Prior to the receiving multimedia stream, the method may include providing information on the personalized items to the user device in response to an initiation signal from the user device. The information on the personalized items may be provided to the user device through a graphic user interface produced and displayed on a display of the user device as a result of executing a designated application installed in the user device.

Prior to the receiving multimedia streams, the method may include receiving an initiation signal from the user device, extracting identification information from the received initiation signal, and determining whether a personalized user interface for the user device is already registered based on the extracted identification information.

The method may include fetching user interface configuration information associated with the identification information when the personalized user interface is already registered and producing a single multimedia stream for a user interface based on the fetched user interface configuration information.

The method may include providing information on the personalized items to the user device in response to an initiation signal from the user device when the personalized user interface is not registered.

The obtaining personalized items may include obtaining, as the personalized items, a background image selected based on the user interface configuration information, obtaining, as the personalized items, a background song selected based on the user interface configuration information, obtaining, as the personalized items, a skin theme selected based on the user interface configuration information, and obtaining, as the personalized items, menu items selected based on the user interface configuration information.

The producing a single multimedia stream may include receiving a plurality of independent video streams from the preferred streaming servers, extracting encoded video data in a unit of video frame from each of the plurality of independent video streams, creating a plurality of slice group data to be used for producing the single multimedia stream for the user interface, from a plurality of encoded video data, creating slice group header information per slice group data, and forming the single multimedia stream including the plurality of slice group data and a plurality of slice group header information.

The creating a plurality of slice group data includes adjusting a data size of each encoded video data, based on the user interface configuration information to display each encoded video data within the personalized user interface. The slice group header information may include position information associated with each slice group corresponding to each slice group data. The slice group data and the slice header information may be based on a flexible macroblock ordering (FMO) technique.

In accordance with another embodiment of the present invention, a method may be provided for producing a personalized user interface at a user device based on a single multimedia stream from a service server. The method may include receiving a single multimedia stream from a service server upon generation of a predetermined event, producing a personalized user interface for controlling interaction with streaming servers based on the received signal multimedia stream, and displaying the produced personalized user interface on a display. The produced personalized user interface may include moving images and personal items.

The moving images may be produced by processing the multimedia streams of preferred streaming servers, which are received through the single multimedia stream, and sizes and positions of the moving images are adjusted based on user interface configuration information.

Prior to the receiving a single multimedia stream, the method may include generating an initiation signal upon the predetermined event and transmitting the generated initiation signal to the service server with identification information. Prior to the receiving a single multimedia stream, the method may further include receiving information on personalized items from the service server, selecting preferred personalized items based on the received information in response to user inputs, generating the user interface configuration information based on the selected preferred personalized items, and transmitting the generated user interface configuration information.

The receiving information on personalized items may include executing a designated application installed in the user device, producing a graphic user interface for displaying the information on personalized items, displaying the produced graphic user interface and receiving selection inputs from a user to select at least one of provided personalized items.

The method may further include receiving a user selection input for selecting one of the moving images, receiving, in real time, a multimedia stream directly from a streaming server associated with the selected moving image in the personalized user interface, and displaying a moving image produced by processing the multimedia stream received in real time from the streaming server associated with the selected moving image in the personalized user interface.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
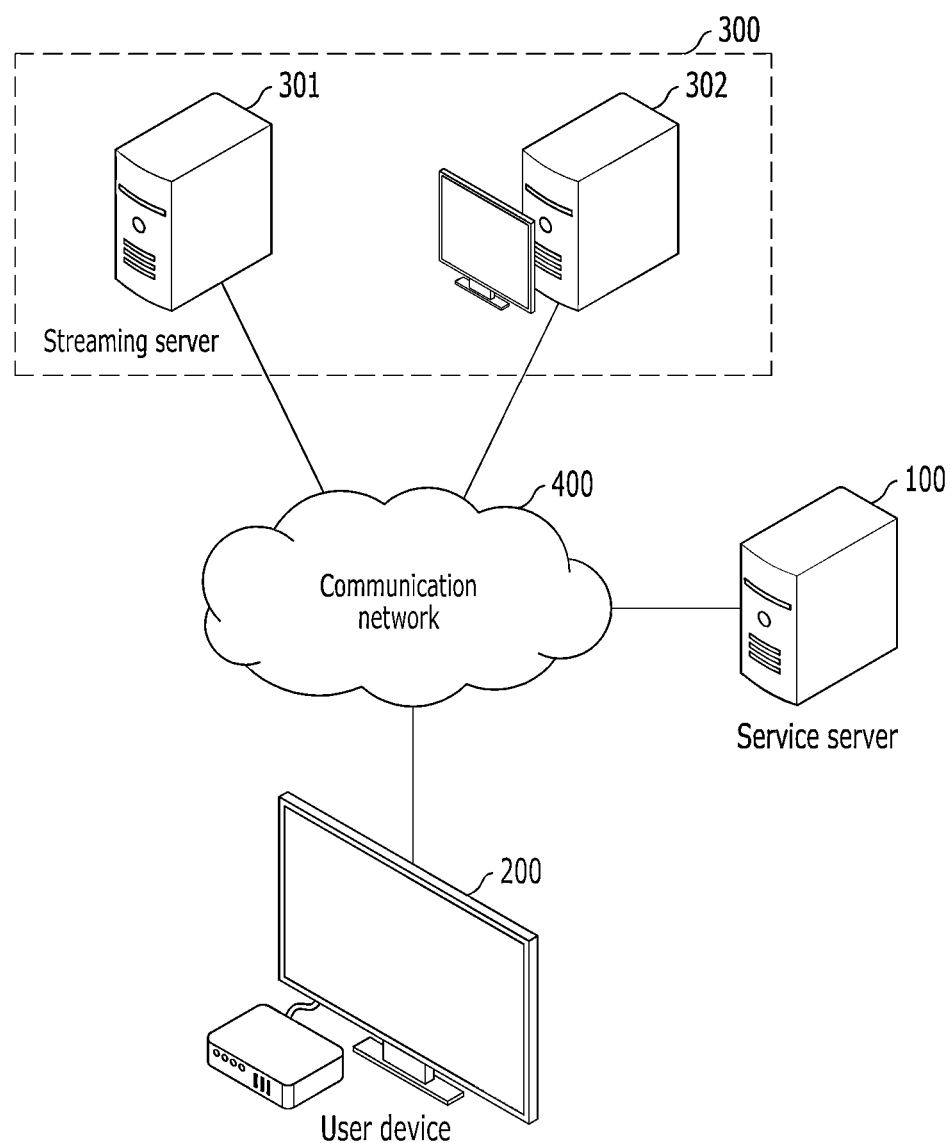
FIG. 1 illustrates a system for providing a moving image based personalized user interface in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a user interface may be produced to include moving images produced by decoding multimedia streams of preferred streaming servers in order to effectively control interaction with a plurality of the streaming servers. Such a user interface may be provided to a user device as a single multimedia stream, referred to as a user interface multimedia stream. That is, such a single multimedia stream for a user interface may be produced, without decoding each of the extracted video streams, by combining video streams extracted from a plurality of multimedia streams received in real-time from a plurality of streaming servers. Furthermore, the user interface may be personalized based on user interface configuration information, which is generated according to user preferences of streaming servers and selected personalized items such as background images, skin themes, layouts, and so forth. Hereinafter, such an operation for producing and providing a moving image based personalized user interface for effectively controlling interaction with streaming servers will be described with reference to FIG. 1, FIG. 2A, and FIG. 2B.

Figure 2A:
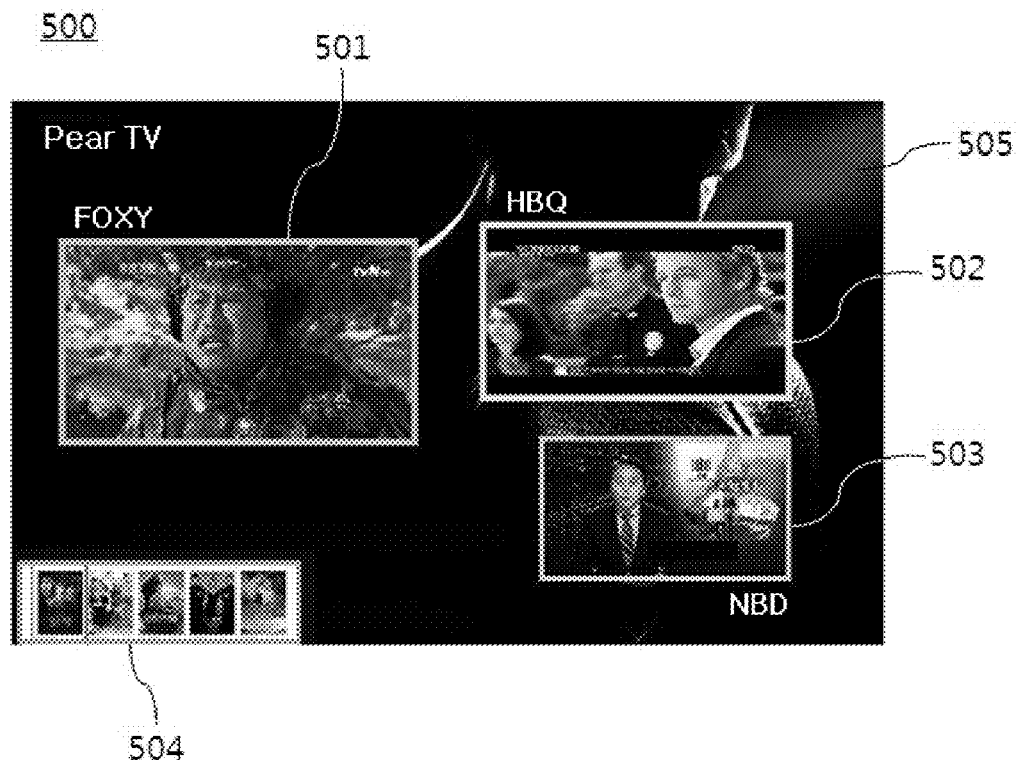
FIG. 2A and FIG. 2B illustrate a moving image based personalized user interface for effectively controlling interaction with streaming servers in accordance with at least one embodiment.
Figure 2B:
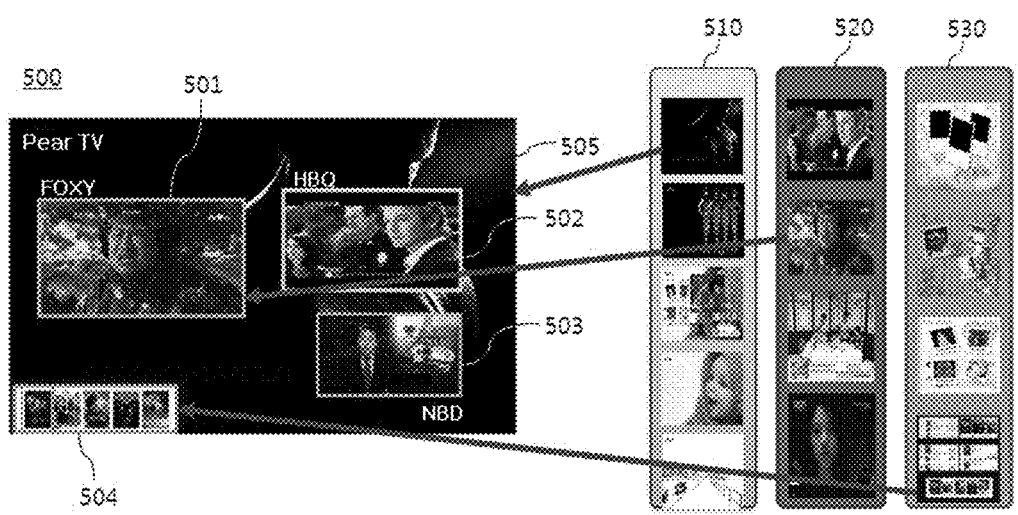

FIG. 1 illustrates a system for providing a moving image based personalized user interface in accordance with at least one embodiment. FIG. 2A and FIG. 2B illustrate a moving image based personalized user interface for effectively controlling interaction with streaming servers in accordance with at least one embodiment.

Referring to FIG. 1, such a system may include service server 100, user device 200, a plurality of streaming servers 300 (e.g., 301 to 30n), and communication network 400. Service server 100, user device 200, and streaming servers 300 may be coupled to each other in order to transmit data to others and to receive data from the others through communication network 400. For convenience and ease of understanding, single user device 200 is illustrated as being coupled to single service server 100, but the present invention is not limited thereto. For example, multiple user devices may be coupled to a single service server, multiple user devices may be coupled to multiple service servers, or a single user device may be coupled to multiple service servers. Furthermore, other entities, such as a web server (not shown) or a cloud storage server (not shown) may be coupled to service server 100 and user device 200 through communication network 400 for obtaining information (e.g., background images or user interface template) to produce a personalized user interface in accordance with at least one embodiment.

Each one of streaming servers 300 may provide a media streaming service. That is, each one of streaming servers 300 may transmit a corresponding multimedia stream. Such multimedia stream may include a video stream, an audio stream, and metadata. When user device 200 receives such a multimedia stream, user device 200 may produce and display moving images on an associated display by decoding the video stream and outputs sound by processing the audio stream through speakers according to information included in the metadata. Streaming servers 300 may be one of a broadcasting station (e.g., a broadcast company), a media operation center, a broadcast distribution center, a contents provider, a video on demand (VOD) content provider, and a personal content provider, but the present invention is not limited thereto. Furthermore, the multimedia streams may include a broadcast channel stream, a VOD content stream, an Internet broadcast stream, a personal content stream, and so forth.

As described, streaming servers 300 may be coupled to service server 100 and user device 200 to transmit multimedia streams through communication network 400. Such communication network 400 may include a terrestrial broadcast network, a cable broadcast network, a satellite broadcast network, an Internet broadcast network, a $3^{rd}$ generation partnership project (3GPP) network, a long term evolution (LTE) network, a world interoperability for microwave access (WIMAX) network, an Internet, a local area network (LAN), a wireless LAN, a wide area network (WAN), a personal area network (PAN), a Bluetooth network, a satellite broadcast network, an analogue broadcasting network, and a digital multimedia broadcasting (DMB) network.

User device 200 may receive multimedia streams from a plurality of streaming servers 300. User device 200 may select one of streaming servers 300 in response to a user input and produce and display moving images of a multimedia stream received from the selected streaming server.

In order to select one of streaming servers 300 to watch moving images of multimedia stream from the selected one, user device 200 may produce and display e a moving image based personalized user interface on display (e.g., 250 in FIG. 5) in accordance with at least one embodiment. For example, user device 200 may display a moving image based personalized user interface as shown in FIG. 2A. Such a moving image based personalized user interface may be provided through a multimedia stream for a user interface, which is generated by service server 200 by combining multimedia streams of selected streaming servers based on user preferences without decoding the multimedia streams from the selected stream servers. Such operation may be referred to as a stitching method and will be described with reference to FIG. 7A to FIG. 9 in detail. Furthermore, the moving image based personalized user interface may be generated to include personalized items such as a background image, a skin theme, a layout, and menu items, which are selected and configured based on user preferences. Accordingly, the moving image based personalized user interface may include at least one moving image (e.g, 501, 502, and 503) produced by processing multimedia streams received from corresponding streaming servers 300. Furthermore, the moving image based personalized user interface may include personalized items, for example, background image 500 and menu items 504, as shown in FIG. 2A.

Accordingly, user device 200 may be any electronic devices capable of receiving a multimedia stream from streaming servers and transmitting data to other entities, capable of producing moving images and a personalized user interface based on the received multimedia stream, and capable of displaying the moving images and the personalized user interface on a corresponding display. For example, user device 200 may include a television, a smart television, a personal computer with a monitor, a set-top box coupled to a television, a set-top box included inside a television, and so forth. However, the present invention is not limited thereto.

User device 200 may receive at least one control signal (e.g., user inputs) through a predetermined user interface from a user. Particularly, user device 200 may receive user inputs for producing a moving image based personalized user interface. For example, user device 200 may receive a button input from a remote controller or receive a touch input from an associated input device. Based on the received user inputs, user device 200 may select at least one of preferred streaming servers and personalized items for configuring the moving image personalized user interface. For example, beside of selecting preferred streaming servers (e.g., broadcast channel), user device 200 may select a user interface template, a skin theme, background still images, menu items, and layouts, as shown in FIG. 2B.

Such personalized items may be provided by service server 100 through communication between user device 200 and service server 100. For example, user device 200 may download a designated application (e.g., software program) from service server 100 and install the designated application. Upon the initiation of the designated application, user device 200 may perform registration and set a personalized user interface in cooperation with service server 100. For example, service server 100 may provide information on the personalized items, for example, 510, 520, and 530 in FIG. 2B, to user device 200. User device 200 may display personalized item information 510, 520, and 530 with a user interface that enables a user to select one of the displayed personalized items. User device 200 may receive selection inputs from a user to select preferred multimedia streams and personalized items and transmit information on the selected preferred multimedia streams and personalized items to service server 100 in accordance with at least on embodiment.

User device 200 may generate user interface configuration information of a personalized user interface based on the received input signals in accordance with at least one embodiment. As described, the user interface configuration information may include information on preferred streaming servers, a size and a position of each moving image produced based on a multimedia stream from each preferred stream server, arrangement of the moving images, and selected personalized items. User device 200 may transmit the generated user interface configuration information to service server 100.

Service server 100 may be a computing system of a service provider that provides a multimedia content providing service. For example, service server 100 may provide a plurality of multimedia contents, such as broadcast channels, VOD contents, personal multimedia contents, and so forth. Furthermore, service server 100 may also provide a personalized user interface having at least one moving image (e.g., moving image based personalized user interface) to user device 100 in order to enable a user to conveniently select one of preferred multimedia contents and display the selected multimedia content in accordance with at least one embodiment.

For example, service server 100 may receive the user interface configuration information from user device 200 and receive a plurality of multimedia streams from streaming servers 300 based on the received user interface configuration information. The user interface configuration information may include information on selected preferred streaming servers and information on personalized items such as a size and a position for displaying each moving image, an arrangement of moving images, a selected skin theme, a selected background still image, a selected user interface template, a selected music, and a selected layout.

Service server 100 may receive multimedia streams from streaming servers 300 selected based on the received user interface configuration information and obtain information on the selected personalized items in accordance with at least one embodiment. Service server 100 may combine the received multimedia streams with the obtained information, generate a user interface multimedia stream for a moving image based personalized user interface based on the user interface configuration information. Service server 100 may transmit such a user interface multimedia stream to user device 200.

In accordance with at least one embodiment, service server 100 may employ a video stitching method to combine a plurality of multimedia streams into a single multimedia stream for a user interface without decoding the video streams in the multimedia streams. Such a video stitching method may use Flexible Macroblock Ordering (FMO) technique (H.264/AVC FMO). Such technique has been introduced to prevent a transmission error, a picture may be partitioned into a plurality of slice groups, and each slice group may be separately encoded. In accordance with at least one embodiment, multimedia streams are combined using a video stitching method using a concept of slice groups in the FMO technique.

Particularly, service server 100 may create a single multimedia stream for a user interface using 'encoded video data' (i.e., video bitstream) included in each video stream (e.g., multimedia stream from a corresponding streaming server), without performing an image reconstruction through a decoding process of each video stream (i.e., a plurality of the received multimedia streams). In this case, service server 100 may create header information (e.g., slice group header information) for each encoded video data (e.g., encoded video data included in at least one multimedia stream) of a multimedia stream received from the preferred streaming server. In this case, each encoded video data may be considered and processed as each slice group data. More specifically, service server 100 may create the header information based on user interface configuration information. Herein, the user interface configuration information may include information on how to display each moving image produced based on a corresponding stream from one of selected streaming servers within a personalized user interface. That is, the user interface configuration information may include information on a size and a position of each moving image produced based on a corresponding stream from one of selected streaming server. Herein, the header information may include at least one of position information and size information associated with each video stream included in the user interface multimedia stream. Such combination procedure of service server 100 will be described in more detail with reference to FIG. 7A, to FIG. 10.

Service server 100 is illustrated as a computing system independent from user device 200 and coupled to user device 200 through communication network 400, but the present invention is not limited thereto. Such service server 100 may be equipped inside user device 200 as a constituent element of user device 200.

As described above, service server 100 may generate a user interface multimedia stream for a moving image based personalized user interface by combining multimedia streams received in real time from selected preferred streaming servers based on user interface configuration information. User device 200 may receive such a user interface multimedia stream from service server 100, produce the moving image based personalized user interface by processing the user interface multimedia stream, and display the produced moving image based personalized user interface on display in order to enable a user to efficiently choose one of streaming servers. Hereinafter, such a moving image based personalized user interface will be described with reference to FIG. 2A, FIG. 2B, FIG. 3A, and FIG. 3B.

FIG. 2A illustrates a moving image based personalized user interface in accordance with at least one embodiment. Referring to FIG. 2A, moving image based personalized user interface 500 may include a plurality of moving images 501 to 503, menu items 504, and background image 505, but the present invention is not limited thereto. For example, moving image based personalized user interface 500 may further include more personalized items such as music to be played while displaying moving image based personalized user interface 500.

Such moving image based personalized user interface 500 may enable a user to efficiently control interaction with streaming servers 300 (e.g., broadcast stations). For example, through moving image based personalized user interface 500, a user may select one of broadcast channels and watch a program produced and displayed by processing a multimedia stream from the selected broadcast channel.

As described, moving image based personalized user interface 500 may be produced by processing a user interface multimedia stream in accordance with at least one embodiment. The user interface multimedia stream may be generated by service server 100. Service server 100 may combine multimedia streams of selected preferred streaming servers based on user interface configuration information without decoding the multimedia streams from the selected preferred stream servers. Such operation may be referred to as a stitching method and will be described with reference to FIG. 7A to FIG. 9.

As shown in FIG. 2A, moving image based personalized user interface 500 may include a plurality of moving images 501 to 503. Each moving image (e.g., 501, 502, and 503) may show a show program or a movie on air, provided from a corresponding broadcast channel (e.g., streaming server). Accordingly, a user might choose one of streaming servers 300 (e.g., broadcast channels) based on a show program or a movie on air in accordance with at least one embodiment. That is, each moving image (e.g., 501, 502, and 503) may be produced and displayed by processing a corresponding multimedia stream received in real time from a preferred streaming server. At least one preferred streaming server may be selected based on user interface configuration information.

Such moving image based personalized user interface 500 may be personalized according to user inputs made through user device 200. That is, a size and a position of each moving image (e.g., 501, 502, or 503) may be controlled according to user preferences. Furthermore, arrangements of moving images 501 to 503 and menu items 504 may be controlled and determined based on user preferences (e.g., user inputs made through user device 200). That is, such personalized items may be controlled based on user interface configuration information generated by user device 200 in response to a user input. The personalized items may also include background image 505 and menu items 504 as shown in FIG. 2A. Such background image 505 and menu items 504 may be selected from information provided from service server 100 in accordance with at least one embodiment. That is, service server 100 may provide personalized item information to user device 200 in order to enable a user to personalize a user interface in accordance with at least one embodiment.

FIG. 2B illustrates personalized item information provided to a user device in accordance with at least one embodiment.

Referring to FIG. 2B, personalized items may be provided by service server 100 through a communication link between user device 200 and service server 100. User device 200 may display the personalized items within a designated user interface in order to enable a user to personalize a user interface. For example, user device 200 may download a designated application (e.g., software program) from service server 100 and install the designated application. Upon the initiation of the designated application, user device 200 may perform registration and set a personalized user interface in cooperation with service server 100.

For example, service server 100 may provide information on the personalized items to user device 200 through graphic user interfaces 510, 520, and 530. That is, user device 200 may display personalized item information through the graphic user interfaces 510, 520, and 530. Particularly, through graphic user interface 510, a user may select a background image for moving image based personalized user interface 500. Through graphic user interface 520, a user may be enabled to select preferred streaming servers (e.g., broadcast channel). Through graphic user interface 530, a user may be enabled to select a skin theme (e.g., layout) for moving image based personalized user interface 500. For convenience and ease of understanding, three graphic user interfaces 510 to 530 are illustrated as being provided to user device 200 for personalizing a user interface, but the present invention is not limited thereto. For example, service server 100 may provide a graphic user interface for enabling a user to select one of music or songs to be played while displaying a personalized user interface.

Based on the personalized items (e.g., graphic user interfaces 510 to 530), a moving image based user interface may be personalized in various ways.

Figure 3A:
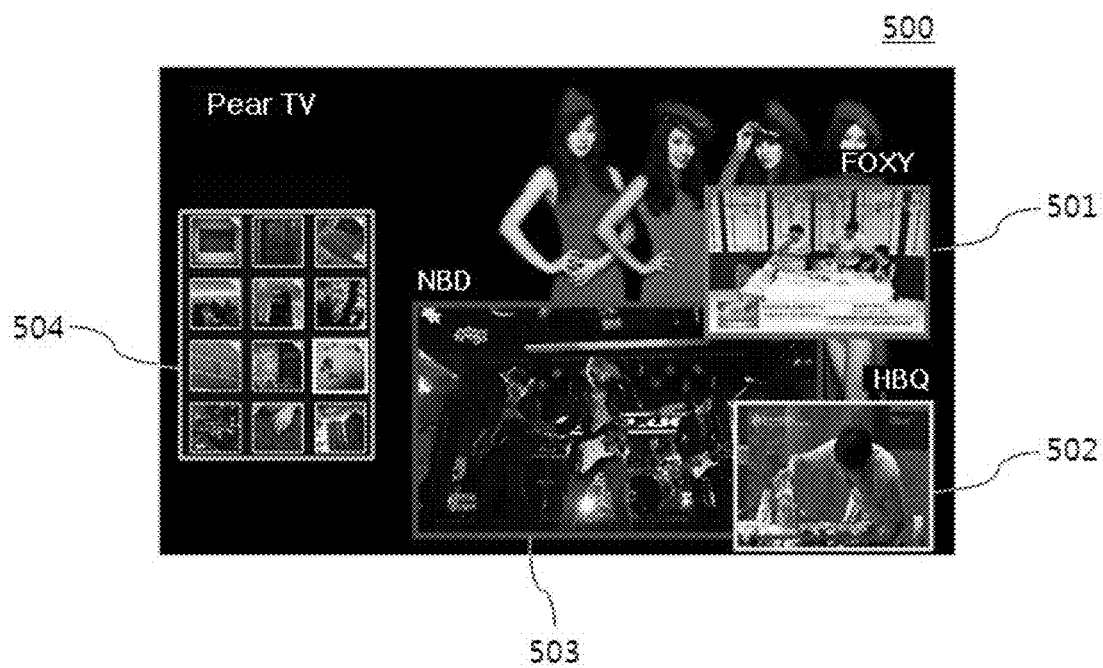
FIG. 3A and FIG. 3B illustrate moving image based personalized user interfaces in accordance with at least one embodiment of the present invention.
Figure 3B:
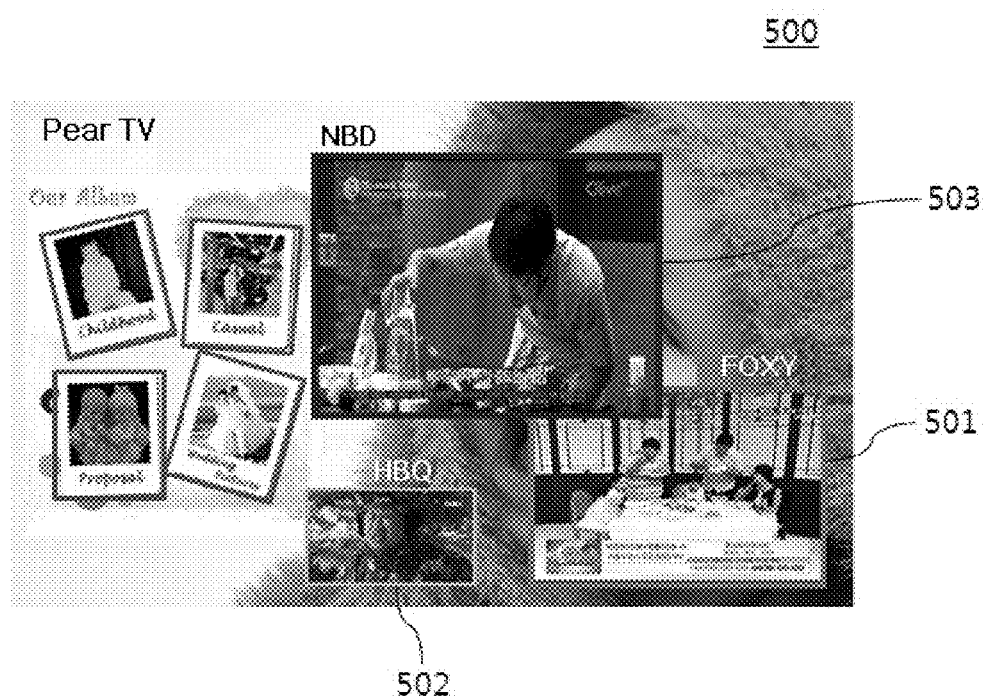

FIG. 3A and FIG. 3B illustrate moving image based personalized user interfaces in accordance with at least one embodiment of the present invention. As shown in FIG. 3A and FIG. 3B, moving images 501 to 503, background image 505, menu item 504, and skin themes thereof may be personalized in various ways according to selections made by a user.

As described, service server 100 may receive user interface configuration information from user device 200, create a personalized user interface based on the received user interface configuration information, and provide the created personalized user interface to user device 200. Hereinafter, such a method for producing and providing a moving image based personalized user interface will be described with reference to FIG. 4.

Figure 4:
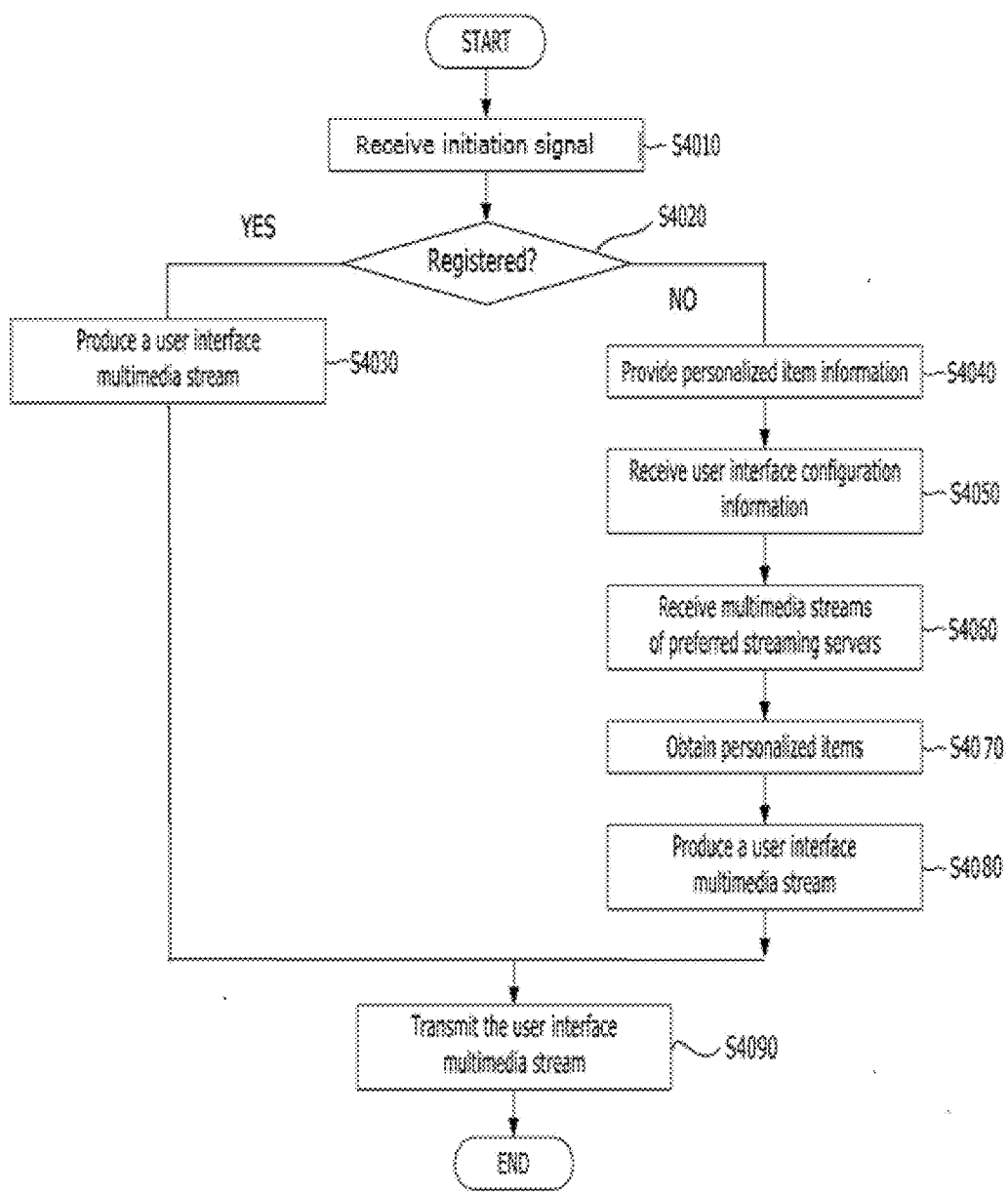
FIG. 4 illustrates a method for creating and providing a moving image based personalized user interface to a user device in accordance with at least one embodiment of the present invention.

FIG. 4 illustrates a method for creating and providing a moving image based personalized user interface to a user device in accordance with at least one embodiment of the present invention.

Referring to FIG. 4, an initiation signal may be received at step S4010. For example, service server 100 receives an initiation signal for requesting a personalized user interface from user device 200 upon the generation of a predetermined event. Such a predetermined event may be turning on user device 200 or receiving a request signal (e.g., user input) from a user through a remote controller. Such an initiation signal may include identification information of a corresponding user or user device 200.

At step S4020, determination may be made so as whether a personalized user interface is previously registered. For example, service server 100 may extract identification information from the received initiation signal and determine whether a personalized user interface is registered in connection with the extracted identification information.

When a personalized user interface associated with the extracted identification information is already registered (No—S4020), a corresponding user interface multimedia stream is produced for the personalized user interface associated with the extracted identification information at step S4030. For example, service server 100 may fetch user interface configuration information associated with the extracted identification information from database (not shown). As described, such user interface configuration information may be created based on user selection for personalizing a user interface. Service server 100 may receive such user interface configuration information from user device 200 with associated identification information and store the received user interface configuration information in association with the identification information.

Based on the fetched user interface configuration information, service server 100 may generate a user interface multimedia stream for the personalized user interface. That is, service server 200 may select preferred streaming servers based on the user interface configuration information, receive multimedia streams from the selected preferred streaming servers, adjust a size and a position of each of the received multimedia streams based on the user interface configuration information, and combine the received multimedia streams with personalized items based on the user interface configuration information.

At step S4090, the produced user interface multimedia stream may be transmitted. For example, service server 100 transmits the produced user interface multimedia stream to user device 200.

When a personalized user interface associated with the extracted identification information is not registered (No—S4020), personalized item information may be provided at step S4040. For example, service server 100 may provide personalized items through a communication link between user device 200 and service server 100, as shown in FIG. 2B. Particularly, user device 200 may display the personalized items within a designated user interface in order to enable a user to personalize a user interface. For example, user device 200 may download a designated application (e.g., software program) from service server 100 and install the designated application. Upon the initiation of the designated application, user device 200 may perform registration and set a personalized user interface in cooperation with service server 100. For example, service server 100 may provide personalized item information 510, 520, and 530 within designated user interface to user device 200, as shown in FIG. 2B.

User device 200 may receive selection inputs for selecting personalized items, such as preferred streaming servers, a preferred skin theme, a preferred background image, a preferred background song, and so forth. User device 200 may generate the user interface configuration information based on such selection inputs and transmit the generated user interface configuration information to service server 100 with associated identification information.

At step S4050, user interface configuration information may be received. For example, service server 100 may receive the user interface configuration information from user device 200 with associated identification information. Service server 100 may store the received user interface configuration information in connection with the associated identification information (e.g., identifier of user device 200 or a user).

At step S4060, preferred streaming servers may be selected based on the received user interface configuration information and corresponding multimedia streams may be received from the selected preferred streaming servers. For example, service server 200 may determine preferred streaming servers based on the received user interface configuration information and receive multimedia streams from the determined preferred streaming servers.

At step S4070, personalized items may be obtained based on the received user interface configuration information. For example, service server 100 may obtain information on the selected personalized items, such as a background still image, a background song, and a skin theme, based on the received user interface configuration information. Such personalized items may be obtained from a memory of service server 100 or other entities coupled through communication network 400. Such entities may include a cloud storage space associated with user device 200 or a corresponding user.

At step S4080, a user interface multimedia stream may be produced by combining the received multimedia streams from the selected preferred streaming servers with the obtained personalized items, based on the user interface configuration information. For example, service server 100 may combine multimedia streams received in real time from the determined preferred streaming server into a single multimedia stream (e.g., user interface multimedia stream). Service server 100 may use a stitching method for combining a plurality of multimedia streams to a single multimedia stream. Such a method will be described in detail with reference to FIG. 7A to FIG. 10.

Furthermore, service server 100 may add information on the personalized items into the user interface multimedia stream for personalizing a user interface according to the preference of a corresponding user.

At step S4090, the generated user interface multimedia stream may be transmitted. For example, service server 100 transmits the produced user interface multimedia stream to user device 200. User device 200 may receive the user interface multimedia stream from service server 100, produce a personalized user interface having moving images of the multimedia streams received in real time from the determined preferred streaming servers, and display the produced personalized user interface on display 250 of user device 200. Through such a personalized user interface, a user may be enabled to efficiently manage or to conveniently select one of the multimedia streams to watch in accordance with at least one embodiment.

After displaying the personalized user interface having a plurality of moving images produced by processing multimedia streams received in real time from preferred streaming servers, user device 200 may receive a user selection input from a user to select one of the moving images. User device 200 may determine a streaming server associated with the selected moving image. Based on the determination result, user device 200 may receive a multimedia stream directly from the determined streaming server associated with the selected moving image in the personalized user interface. User device 200 may display a moving image produced by processing the multimedia stream directly received in real time from the determined streaming server associated with the selected moving image in the personalized user interface.

Figure 5:
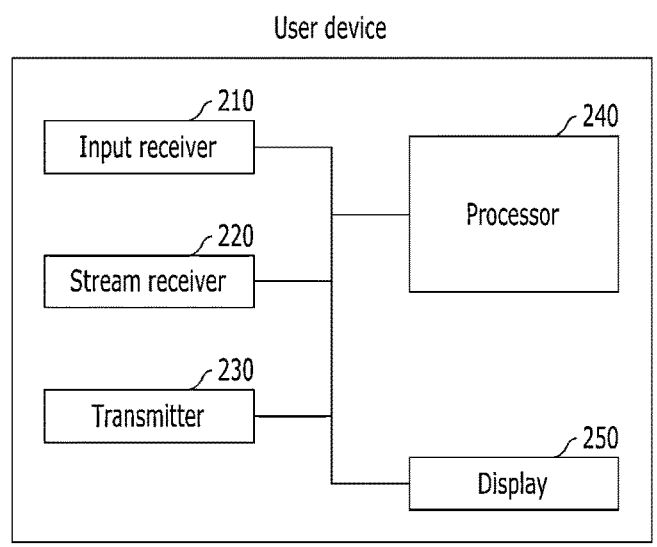
FIG. 5 illustrates a user device for producing and displaying a moving image based personalized user interface for controlling interaction with streaming servers in accordance with at least one embodiment of the present invention.

FIG. 5 illustrates a user device for producing and displaying a moving image based personalized user interface for controlling interaction with streaming servers in accordance with at least one embodiment of the present invention.

Referring to FIG. 5, user device 200 may include user input receiver 210, stream receiver 220, transmitter 230, processor 240, and display 250. For convenience and ease of understanding, user device 200 is illustrated as including five constituent elements associated to producing and displaying a moving image based personalized user interface, but the present invention is not limited thereto.

User device 200 may be any electronic devices capable of receiving a multimedia stream from and transmitting data to servers, capable of producing moving images and a personalized user interface based on the received multimedia stream, and capable of displaying the moving images and the personalized user interface on a corresponding display. For example, user device 200 may include a television, a smart television, a personal computer with a monitor, a set-top box coupled to a television, a set-top box included inside a television, and so forth. However, the present invention is not limited thereto. For example, user device 200 may receive multimedia streams from a plurality of streaming servers 300, select one of streaming servers 300 in response to a user input, and produce and display moving images of a multimedia stream received from the selected streaming server. Furthermore, in order to select one of streaming servers 300, user device 200 may provide a moving image based personalized user interface in accordance with at least one embodiment. User device 200 may receive user inputs for producing a moving image based personalized user interface. User device 200 may generate user interface configuration information of a personalized user interface based on the received input signals in accordance with at least one embodiment. As described, the user interface configuration information may include information on preferred streaming servers, a size and a position of each moving image produced based on a multimedia stream from each preferred stream server, and selected personalized items. User device 200 may transmit the generated user interface configuration information to service server 100.

User input receiver 210 may receive at least one control signal for producing a moving image based personalize user interface through a predetermined user interface produced and displayed as a result of executing a predetermined application. For example, user input receiver 210 may receive inputs from a user for selecting preferred streaming servers (e.g., broadcast channels) through a remote controller or receive inputs from a user for configuring personalized items in the moving image based personalized user interface. Furthermore, user input receiver 210 may receive various inputs for personalizing a user interface, such as selecting one of personalized items provided from service server 100.

Processor 240 may determine at least one of preferred multimedia streams (e.g., broadcast channels) and personalized items (e.g., a skin theme, a background image, and a size and a position of a moving image of a preferred multimedia stream) based on the received user input through input receiver 210.

Processor 240 may generate user interface configuration information based on the preferred multimedia streams and personalized items, selected based on the user inputs received through user input receiver 210. The user interface configuration information may include information on preferred streaming servers (preferred multimedia streams), a size and a position of each moving image produced based on a multimedia stream from each preferred stream server, selected personalized items such as a skin theme, a background image, and a menu item, and a size and a position of a moving image of each preferred multimedia stream.

Transmitter 230 may transmit the generated user interface configuration information to service server 100. Transmitter 230 may transmit identification information of a corresponding user or a corresponding user device with the generated user interface configuration information. Furthermore, transmitter 230 may transmit data necessary for interacting with service server 100 to service server 100 through communication network 400.

Stream receiver 220 may receive multimedia streams from service server 100 or streaming servers 300 in accordance with at least one embodiment. For example, stream receiver 220 may receive a multimedia stream of a streaming server selected based on a moving image based personalized user interface in response to a user input.

Furthermore, stream receiver 220 may receive a user interface multimedia stream for a personalized user interface from service server 100 in accordance with at least one embodiment. The user interface multimedia stream may be generated by combining multimedia streams of selected preferred streaming servers and selected personalized items. By processing the user interface multimedia stream, user device 100 may produce and display a moving image based personalized user interface (e.g., 500 in FIG. 2A) for efficiently and conveniently controlling interaction with streaming servers.

Display 250 may display at least one of moving images corresponding to a plurality of multimedia streams received in real time from streaming servers 300. Furthermore, display 250 may display a personalized user interface having at least one moving image of a preferred streaming server when a user interface multimedia stream is received from service server 100. When the user interface multimedia stream is received while display 250 is displaying moving images of a predetermined multimedia stream from a selected streaming server 300, a corresponding personalized user interface may be displayed over the moving images of the predetermined multimedia stream. However, the present invention is not limited thereto. For example, display 250 may stop displaying the moving images of the predetermined multimedia stream and display only the corresponding moving image based personalized user interface.

As described, the moving image based personalized user interface may be created by service server 100 and provided to user device 200 in accordance with at least one embodiment. Hereinafter, service server 100 will be described in more detail with reference to FIG. 6.

Figure 6:
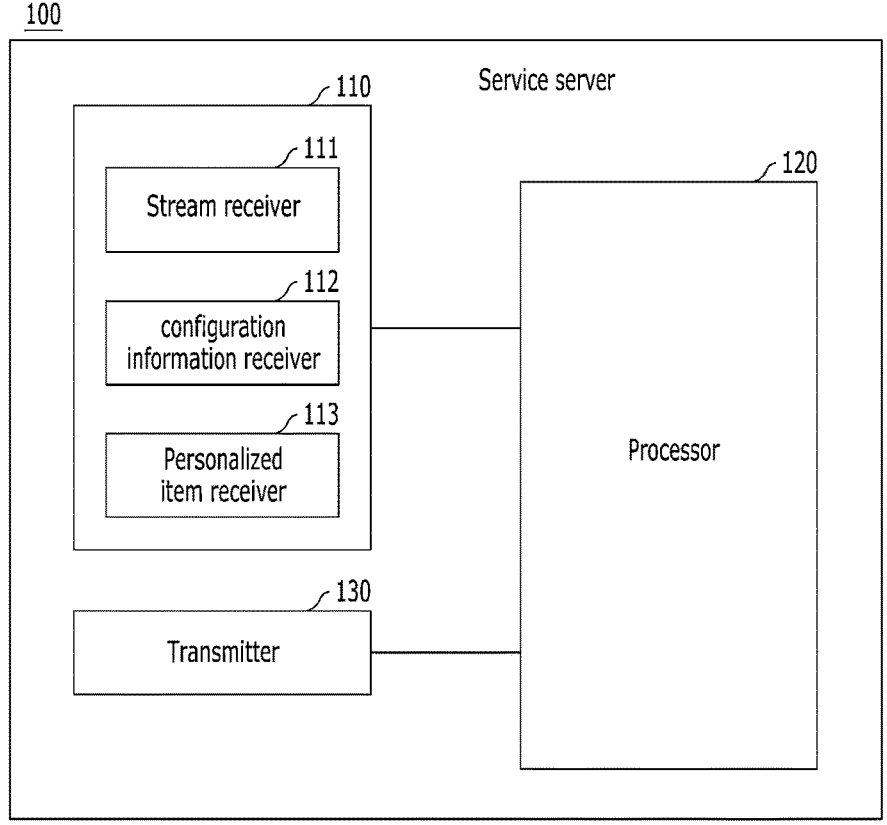
FIG. 6 illustrates a service server for creating and providing a personalized user interface to a user device in accordance with at least one embodiment.

FIG. 6 illustrates a service server in accordance with at least one embodiment. Referring to FIG. 6, service sever 100 may include receiver 110, processor 120, and transmitter 130. Receiver 110 may include stream receiver 111, configuration information receiver 112, and personalized item receiver 113.

As described, service server 100 may be a computing system of a service provider that provides a multimedia content providing service and a personalized user interface. For example, service server 100 may receive the user interface configuration information from user device 200 and receive a plurality of multimedia streams from streaming servers 300 based on the received user interface configuration information. Service server 100 may receive multimedia streams from streaming servers 300 selected based on the received user interface configuration information and obtain information on the selected personalized items in accordance with at least one embodiment. Service server 100 may combine the received multimedia streams with the obtained information, generate a user interface multimedia stream for a moving image based personalized user interface based on the user interface configuration information. Service server 100 may transmit such a user interface multimedia stream to user device 200. In accordance with at least one embodiment, service server 100 may employ a video stitching method to combine a plurality of multimedia streams into a single multimedia stream for a user interface without decoding the video streams in the multimedia streams.

Receiver 110 may receive at least one multimedia stream from one of streaming servers. More specifically, receiver 110 may include stream receiver 111 and configuration information receiver 112. Stream receiver 111 may receive at least one multimedia stream (e.g., one or more broadcast channel streams) from at least one streaming server 300. Configuration information receiver 112 may receive user interface configuration information from user device 200. Configuration information receiver 112 may further receive identification information of one of a corresponding user or user device 200 with the user interface configuration information. Such identification information may be stored with mapping relation to the corresponding user or user device

200. The user interface configuration information may include information on selected preferred streaming servers, information on user created contents (UCC) updated at a cloud storage space, and information on personalized items such as a size and a position for displaying each moving image, an arrangement of moving images, a selected skin theme, a selected background still image, a selected user interface template, and a selected layout.

Processor 120 may create a user interface multimedia stream for a personalized user interface having at least one moving image by combining a plurality of multimedia streams received in real time from selected preferred streaming servers. Processor 120 may generate a header of each one of a plurality of video streams based on area information included in the user interface configuration information and combines the generated header and the plurality of multimedia streams, thereby generating a single multimedia stream for the personalized user interface. The generated header may include information on at least one of a position and a size of each one of video streams included in the user interface stream.

More specifically, processor 120 may create a single multimedia stream using 'encoded video data' included in each video stream, without performing an image reconstruction through a decoding process of each video stream (i.e., the received broadcast stream(s)). In at least one embodiment, processor 120 may create a single transport stream (TS) by multiplexing the single video stream and corresponding audio streams. Such combination procedure of processor 120 will be described in more detail with reference to FIG. 7A, FIG. 7B, FIG. 8A, FIG. 8B, and FIG. 9.

Transmitter 130 may transmit the created user interface multimedia stream to user device 200 through communication network 400. For example, the created user interface multimedia stream may be transmitted through one of a broadcast transmission scheme, a multicast transmission scheme, and a unicast transmission scheme. Meanwhile, in at least one embodiment, when transmitting the created user interface multimedia stream to user device 200, transmitter 130 may establish a session in connection with user device 200, according to a real time streaming protocol (RTSP).

Transmitter 130 may transmit obtained information on personalized items such as an obtained background still image, an obtained skin theme, and obtained background music, to user device 200. For example, transmitter 130 may transmit the user interface multimedia stream to user device 200 through a first session and transmit the personalized item information to user device 200 through a second session.

When receiver 110 receives updated user interface configuration information from user device 200, processor 120 may generate an updated user interface multimedia stream based on the updated user interface configuration information and transmitter 130 may transmit the updated user interface stream to user device 200.

Processor 120 may further generate metadata based on the user interface multimedia stream. Metadata may include information on at least one of a resolution, a bit rate, a frame rate, a property (attribute) of the user interface multimedia stream. The generated metadata may be transmitted to user device 200 through transmitter 130.

As described above, service server 100 may generate a single multimedia stream by combining a plurality of multimedia streams received in real time from preferred stream servers for providing a personalized user interface to user device 200 in accordance with at least one embodiment.

Hereinafter, a method for creating such a user interface multimedia stream will be described in detail with reference to FIG. 7A to FIG. 10.

Figure 7A:
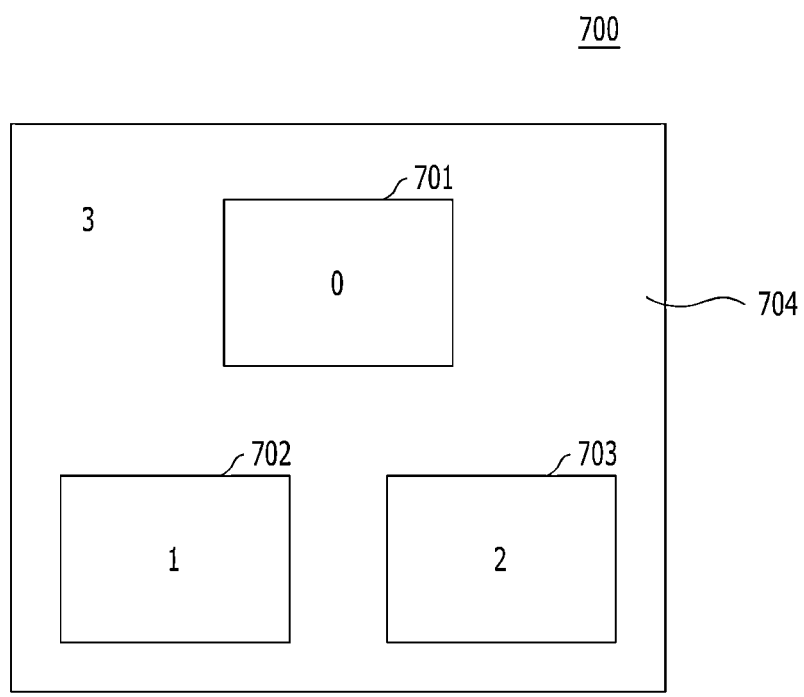
FIG. 7A and FIG. 7B illustrate mapping a plurality of video streams to a plurality slice groups.
Figure 7B:
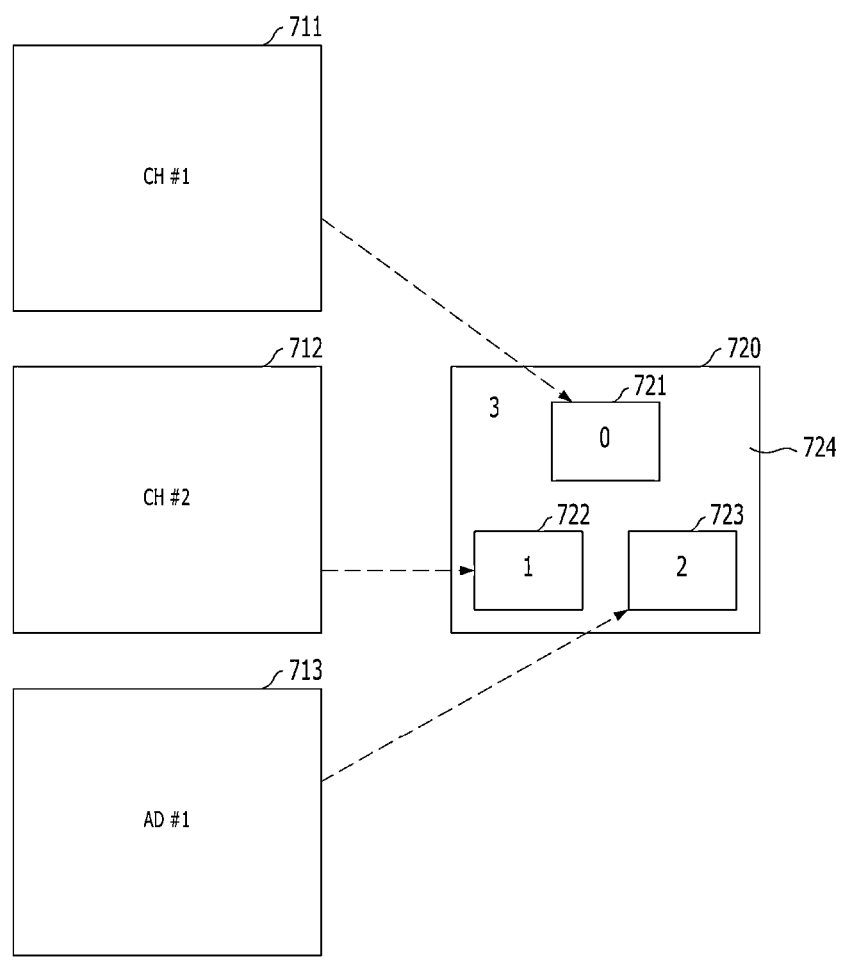

FIG. 7A and FIG. 7B illustrate mapping a plurality of video streams to a plurality slice groups. In a typical H.264/AVC FMO technique, in order to prevent a transmission error, a picture may be partitioned into a plurality of slice groups, and each slice group may be separately encoded. A video stream combination method (e.g., a video stitching) according to the present embodiment may be performed by using a concept of slice groups in a FMO technique.

Referring to FIG. 7A, a single video stream for a personalized user interface may include a plurality of slice groups. More specifically, such a single user interface video stream may be formed by inversely applying a concept of slice group used in the FMO technique. In other words, each of a plurality of multimedia streams of preferred streaming servers to be combined into a single user interface video stream may be mapped to each slice group. For example, as shown in FIG. 7A, single user interface video stream 700 created through a vide combination procedure may be formed by four slice groups such as "slice 0" through "slice 3." Herein, "701" through "704" represent "slice group 0," "slice group 1," "slice group 2," and "slice group 3," respectively. Slice group 3 ("704") may be referred to as a background group. As shown in FIG. 7A, a shape of slice groups may be a square or rectangular shape according to FMO type 2 ("foreground with leftover"), but the present invention is not limited thereto. With respect to a single user interface video stream, the number of slice groups may increase or decrease according to an addition or deletion of video streams. Furthermore, the position and/or size of slice groups may be determined or changed according to at least one of (i) the number of video streams to be combined, (ii) predetermined user interface configuration information, (iii) a user selection, and (iv) stream viewing rates. Furthermore, a variety of personalized items including user interface templates may be provided to user device 200 such that a corresponding user is enabled to personalize a user interface. According to such user interface configuration information, the user interface video stream may be produced.

Referring to FIG. 7B, service server 200 may create user interface video stream 720 by combining a plurality of multimedia streams (e.g., video streams 711 to 713) received in real time from preferred streaming servers, which may be selected based on the user interface configuration information. More specifically, service server 200 may create user interface video stream 720 by deploying a plurality of video streams 711 to 713 according to mapping relation between target video streams 711 to 713 to be combined into user interface video stream 720 and slice groups 721, 722, and 723 in a personalized user interface displayed on a display of user device 200.

For example, (i) video stream 711 of a CH #1 streaming server may be mapped to slice group 0 ("721"), (ii) video stream 712 of a CH #2 streaming server may be mapped to slice group 1 ("722"), and (iii) video stream 713 of an AD #1 streaming server may be mapped to slice group 2 ("723"). Herein, a background still image may be mapped to "slice group 3 (background group)" ("724"). The background image may be determined by service server 200, but the present invention is not limited thereto. In other embodiments, as shown in FIG. 8B, user interface video stream 720 may be formed without the background group (e.g., slice group 3 ("724")).

Figure 8A:
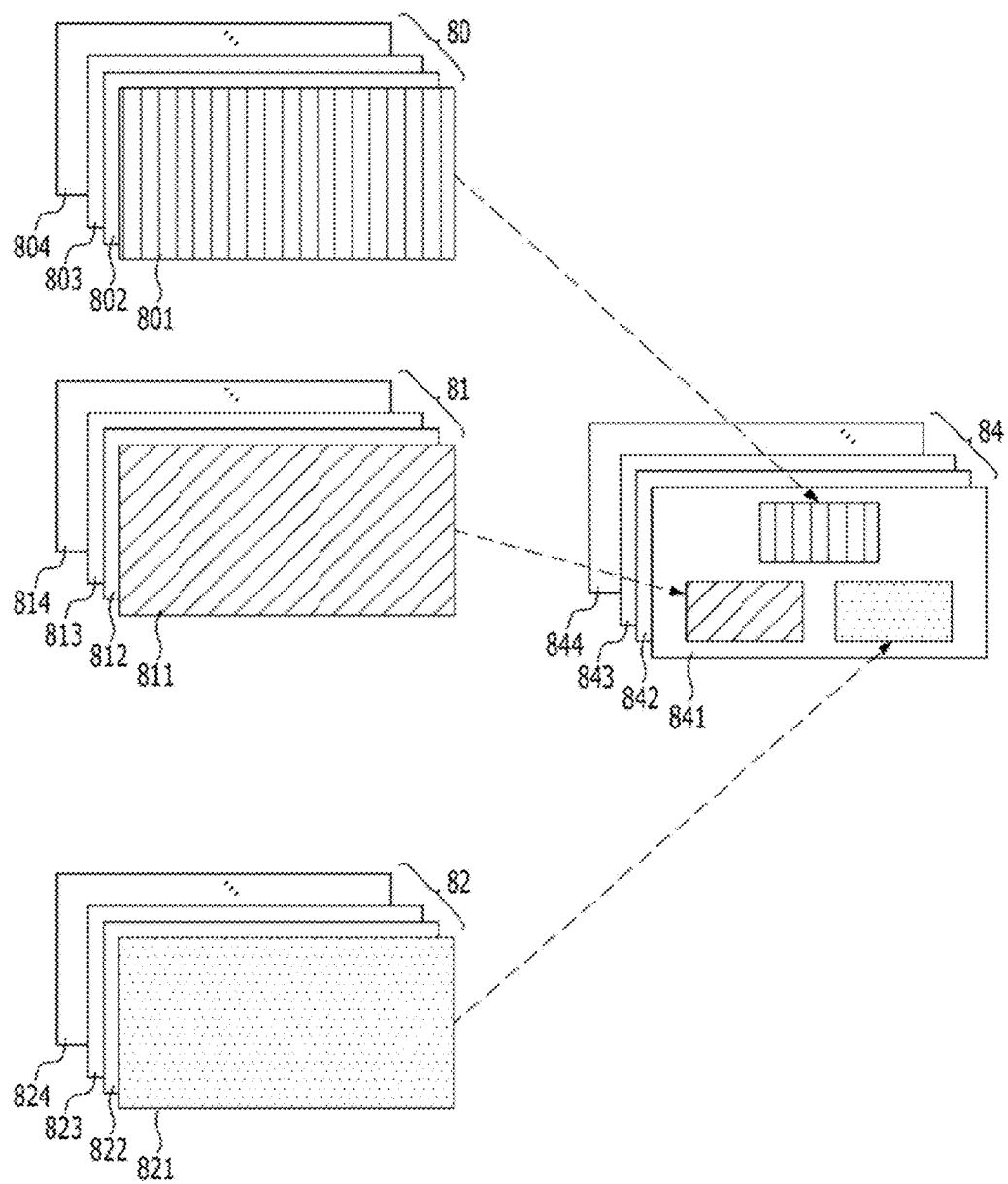
FIG. 8A and FIG. 8B illustrate a concept of a video stream combination method performed in a unit of frame in accordance with at least one embodiment.
Figure 8B:
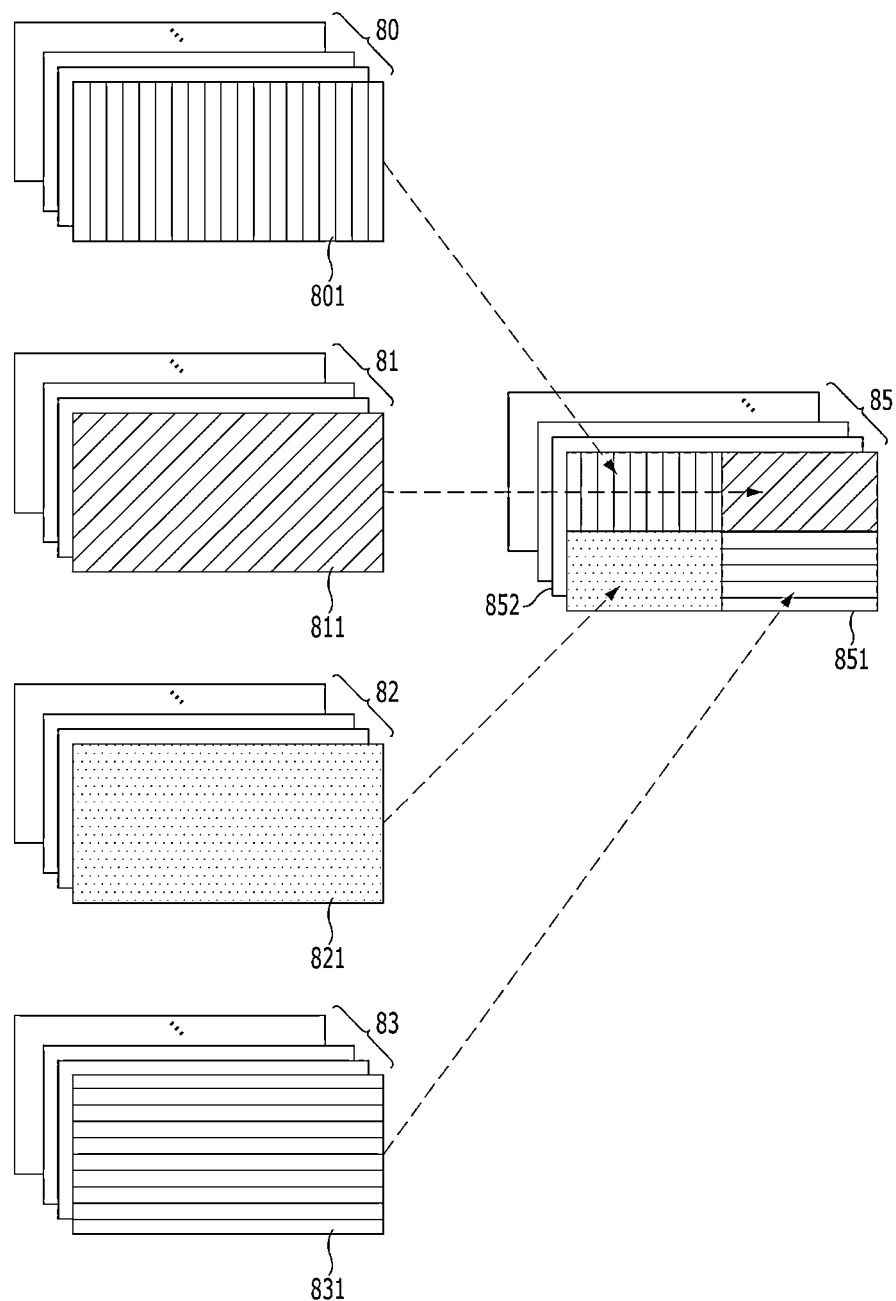

FIG. 8A and FIG. 8B illustrate a concept of a video stream combination method performed in a unit of frame in accordance with at least one embodiment. FIG. 8A illustrates a video combination procedure of forming a user interface video stream by combining three multimedia streams (e.g., two broadcast channel streams and one video advertisement stream, or three broadcast channel streams). In particular, FIG. 8A illustrates embodiments including a slice group corresponding to a background group.

As shown in FIG. 8A, each video stream (e.g., 80, 81, and 82) may include a plurality of image frames. For example, video stream 80 (e.g., video streams of CH #1) may include a plurality of image frames such as frame #0 (801), frame #1 (802), frame #2 (803), and frame #3 (804). Video stream 81 (e.g., video streams of CH #2) may include a plurality of image frames such as frame #0 (811), frame #1 (812), frame #2 (813), and frame #3 (814). Video stream 82 (e.g., video streams of AD #1) may a plurality of image frames such as frame #0 (821), frame #1 (822), frame #2 (823), and frame #3 (824).

In this case, a single combined video stream (e.g., the user interface multimedia stream) may be formed using "corresponding encoded video data" included in the three video streams (80, 81, 82) in a unit of frame. More specifically, combined frame #0 (841) of the single combined video stream 84 may be formed using (i) encoded video data corresponding to frame #0 (801) of video stream 80, (ii) encoded video data corresponding to frame #0 (811) of video stream 81, (iii) encoded video data corresponding to frame #0 (821) of video stream 82, and (iv) encoded video data corresponding to a background image. In this case, each of the plurality of encoded video data may be size-adjusted, and then be processed as slice group data. In the same manner, combined frame #1 (842), combined frame #2 (843), and combined frame #3 (844) may be formed.

Meanwhile, FIG. 8B illustrates a video combination procedure of forming a single combined video stream (e.g., user interface multimedia stream) by combining four video streams (e.g., three broadcast channel streams and one video advertisement stream, or four broadcast channel streams). In particular, FIG. 8B illustrates embodiments not including a slice group corresponding to a background group.

As described in FIG. 8B, single combined video stream 85 (e.g., user interface multimedia stream) may be formed by combining four video streams (80, 81, 82, and 83) in a unit of frame. More specifically, combined frame #0 (851) of the single combined video stream 85 may be formed using (i) encoded video data corresponding to frame #0 (801) of video stream 80, (ii) encoded video data corresponding to frame #0 (811) of video stream 81, (iii) encoded video data corresponding to frame #0 (821) of video stream 82, and (iv) encoded video data corresponding to frame #0 (831) of video stream 83. In this case, combined frames of the single combined video stream 85 may be formed without a background image.

More specifically, a video stream combination server according to at least one embodiment may extract required portions (i.e., encoded video data) from the bitstreams of a plurality of video streams (e.g., broadcast channel streams received from broadcast servers, and/or at least one advertisement video stream to be newly added), and create a single combined video stream using the extracted bitstream portions (i.e., encoded video data). Such video stream combination scheme using a plurality of encoded video data extracted from a plurality of video streams will be described in more detail with reference to FIG. 9.

Figure 9:
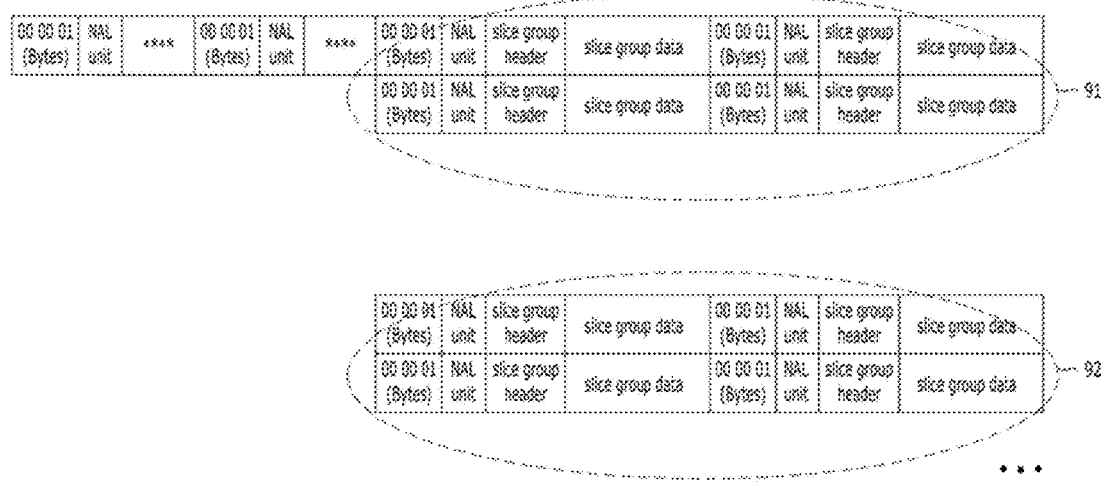
FIG. 9 illustrates a bitstream structure of a user interface video stream in accordance with at least one embodiment.

FIG. 9 illustrates a bitstream structure of a user interface video stream in accordance with at least one embodiment. As described in FIG. 8A and FIG. 8B, a user interface video stream (i.e., a single video stream created by combining a plurality of video streams) may be a set of combined frames (e.g., 84, 85). Herein, the combined frames (e.g., 84, 85) may be created using a plurality of encoded video data extracted from the plurality of video streams (e.g., 80, 81, 82, 83) in a unit of frame. In this case, each of the plurality of encoded video data may be size-adjusted, and then be processed as slice group data.

Particularly, FIG. 9 illustrates a bitstream structure (e.g., H.264 bitstream structure) to which FMO type 2 is applied, in the case that each combined frame of a single video stream is formed by four slice groups. For example, as shown in FIG. 8A, four slice groups may include (i) three slice groups for three video streams, and (ii) one slice group corresponding a background group. Alternatively, as shown in FIG. 8B, four slice groups may include four slice groups for four video streams without a background group.

For example, "91" represents a bitstream structure associated with "combined frame 841" or "combined frame 851." Herein, each "slice group data" field may include "encoded video data" (more specifically, size-adjusted encoded video data) corresponding to each video stream (e.g., CH #1, CH #2, AD #1, or AD #2). "92" represents a bitstream of "combined frame 842" or "combined frame 852." Each "slice group header" field may include position information (i.e., information on a position of the slice group in a corresponding combined frame) on a corresponding slice group.

Figure 10:
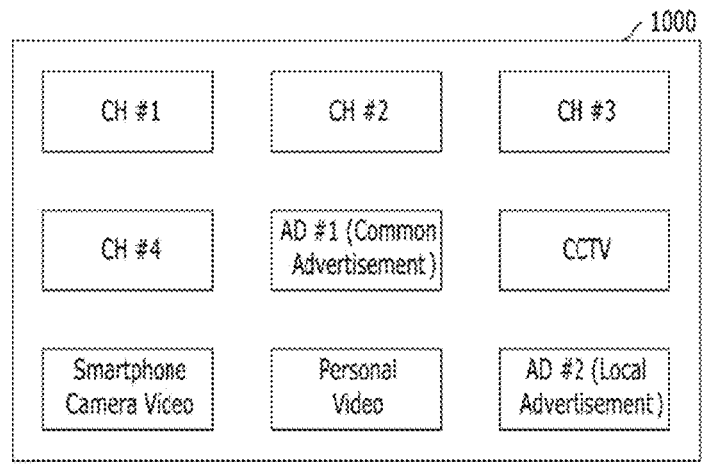
FIG. 10 illustrates an exemplary personalized user interface having multiple moving images produced from a plurality of multimedia streams in accordance with at least one embodiment.

FIG. 10 illustrates an exemplary personalized user interface having multiple moving images produced from a plurality of multimedia streams in accordance with at least one embodiment.

Referring to FIG. 10, when receiving a user interface video stream (i.e., a combined video stream) including a plurality of video stream (e.g., a broadcast channel stream, a video advertisement stream) from service server 100, user device 200 may decode the received user interface video stream using a single decoder, and then display the decoded user interface video stream. In this case, a plurality of encoded video data (i.e., a plurality of encoded video data associated with a plurality of video streams) included in the user interface video stream may be displayed on a single screen (e.g., 1000) of user device 200. For example, as shown in FIG. 10, (i) a variety of broadcast streams associated with a plurality of broadcast channels (e.g., CH #1, CH #2, CH #3, CH #4) and (ii) video advertisement streams (e.g., AD #1, AD #2) may be displayed on a single screen (e.g., 1000) of user device 200.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of producing a personalized user interface having at least one moving image for managing streaming servers by a service server, the method comprising:
   receiving an initiation signal from the user device;
   extracting identification information from the received initiation signal;
   receiving user interface configuration information for forming a personalized user interface from a user device, wherein the user interface configuration information includes information on preferred multimedia streams and information on a personalized screen configuration for display of the preferred multimedia streams, wherein the information on the personalized screen configuration comprises information on a size and a position for displaying each moving image, an arrangement of moving images, a skin theme, a background still image, a user interface template, and a layout for displaying the personalized user interface;
   receiving a plurality of multimedia streams transmitted in real time from preferred streaming servers selected based on the user interface configuration information;
   obtaining personalized items based on the user interface configuration information;
   producing, by the service server, a single multimedia stream for the personalized user interface by combining the received plurality of multimedia streams and the obtained personalized items based on the user interface configuration information; and
   transmitting the produced single multimedia stream to the user device,
   wherein the producing a single multimedia stream includes:
      extracting encoded video data in a unit of video frame from each video stream included in each of the plurality of multimedia streams;
      creating a plurality of slice group data to be used for producing the single multimedia stream for the user interface, from the extracted encoded video data, based on the user interface configuration information; and
      forming the single multimedia stream using the plurality of slice group data; and
   wherein the creating includes:

adjusting, by the service server, a data size of each encoded video data extracted from each video stream, based on the user interface configuration information such that each encoded video data is displayed in a corresponding target screen area of the user device determined based on the user interface configuration information.

2. The method of claim 1, wherein the transmitting the produced single multimedia stream comprises:
at the user device, producing the personalized user interface by processing the single multimedia stream received from the service server and displaying on a display the personalized user interface including moving images and personalized items,
wherein each one of the moving images is produced by processing a corresponding one of the plurality of multimedia streams received in real time from the preferred streaming servers and adjusted in a size and a position based on the user interface configuration information.

3. The method of claim 1, prior to the receiving multimedia stream, comprising:
providing information on the personalized items to the user device in response to an initiation signal from the user device.

4. The method of claim 3, wherein the information on the personalized items is provided to the user device through a graphic user interface produced and displayed on a display of the user device as a result of executing a designated application installed in the user device.

5. The method of claim 1, prior to the receiving a plurality of multimedia streams, comprising:
determining whether a personalized user interface for the user device is already registered based on the extracted identification information.

6. The method of claim 5, comprising:
fetching user interface configuration information associated with the identification information when the personalized user interface is already registered; and
producing the single multimedia stream for a user interface based on the fetched user interface configuration information.

7. The method of claim 5, comprising:
providing information on the personalized items to the user device in response to an initiation signal from the user device when the personalized user interface is not registered.

8. The method of claim 1, wherein the obtaining personalized items comprises:
obtaining, as the personalized items, a background image selected based on the user interface configuration information;
obtaining, as the personalized items, a background song selected based on the user interface configuration information;
obtaining, as the personalized items, a skin theme selected based on the user interface configuration information; and
obtaining, as the personalized items, menu items selected based on the user interface configuration information.

9. The method of claim 1, wherein the producing a single multimedia stream comprises:
obtaining a plurality of independent video streams from the plurality of multimedia streams;
extracting the encoded video data in a unit of video frame from each of the plurality of independent video streams;
creating the plurality of slice group data to be used for producing the single multimedia stream for the user interface, from a plurality of encoded video data, based on the user interface configuration information;
creating slice group header information per slice group data based on the user interface configuration information; and
forming the single multimedia stream including the plurality of slice group data and a plurality of slice group header information.

10. The method of claim 9, wherein the slice group header information includes position information associated with each slice group corresponding to each slice group data.

11. The method of claim 9, wherein the slice group data and the slice header information are based on a flexible macroblock ordering (FMO) technique.

12. The method of claim 1, wherein the adjusting includes:
reducing the data size of each encoded video data such that each encoded video data is displayed in the corresponding target screen area on a single screen of the user device.

13. A method of producing a personalized user interface by a user device based on a single multimedia stream from a service server, the method comprising:
transmitting, by a user device, user interface configuration information for forming a personalized user interface to a service server, wherein the user interface configuration information includes information on preferred multimedia streams and information on a personalized screen configuration for display of the preferred multimedia streams, wherein the information on the personalized screen configuration comprises information on a size and a position for displaying each moving image, an arrangement of moving images, a skin theme, a background still image, a user interface template, and a layout for displaying the personalized user interface;
receiving a single multimedia stream from the service server upon generation of a predetermined event;
producing the personalized user interface for controlling interaction with streaming servers based on the received signal multimedia stream; and
displaying the produced personalized user interface on a display,
wherein the produced personalized user interface includes moving images and personal items;
wherein the single multimedia stream is, by the service server, produced by performing the steps of:
receiving a plurality of multimedia streams transmitted in real time from preferred streaming servers selected based on the user interface configuration information;
obtaining personalized items based on the user interface configuration information; and
producing the single multimedia stream by combining the received multimedia streams and the obtained personalized items based on the user interface configuration information; and
wherein the producing the single multimedia stream includes:
extracting encoded video data in a unit of video frame from each video stream included in each of the plurality of multimedia streams;
creating a plurality of slice group data to be used for producing the single multimedia stream, from the extracted encoded video data, based on the user interface configuration information, wherein the creating includes adjusting, by the service server, a data size of each video data extracted from each video stream, based on the user interface configuration information such that each encoded video data is displayed in a corresponding target screen area of the user device determined based on the user interface configuration information; and forming the single multimedia stream using the plurality of slice group data.

14. The method of claim 13, wherein the moving images are produced by processing the multimedia streams of the preferred streaming servers, which are received through the single multimedia stream, and sizes and positions of the moving images are adjusted based on the user interface configuration information.

15. The method of claim 13, prior to the transmitting, comprising:

generating an initiation signal upon the predetermined event; and transmitting the generated initiation signal to the service server with identification information.

16. The method of claim 13, wherein the transmitting comprises:

receiving information on the personalized items from the service server;

selecting preferred personalized items based on the received information in response to user inputs;

generating the user interface configuration information based on the selected preferred personalized items; and transmitting the generated user interface configuration information.

17. The method of claim 16, wherein the receiving information on personalized items comprises:

executing a designated application installed in the user device;

producing a graphic user interface for displaying the information on the personalized items; and displaying the produced graphic user interface and receiving selection inputs from a user to select at least one of provided personalized items.

18. The method of claim 13, comprising:

receiving a user selection input for selecting one of the moving images;

receiving, in real time, a multimedia stream directly from a streaming server associated with the selected moving image in the personalized user interface; and displaying a moving image produced by processing the multimedia stream received in real time from the streaming server associated with the selected moving image in the personalized user interface.

* * * * *